A. E. BERGEY.
MECHANISM FOR DRIVING TOOLS.
APPLICATION FILED FEB. 25, 1920.
1,406,965.
Patented Feb. 21, 1922.
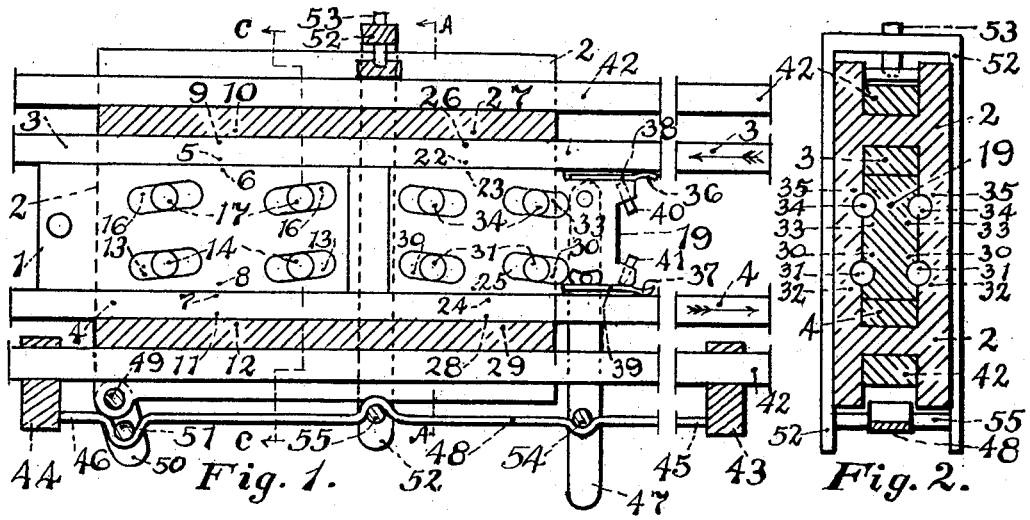
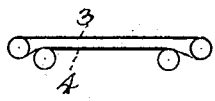
Fig. 3.
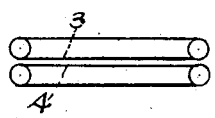
Fig. 4.
Fig. 5.
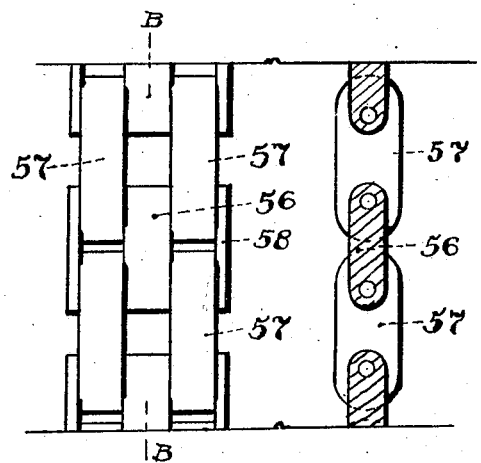
Fig. 6.   Fig. 7.
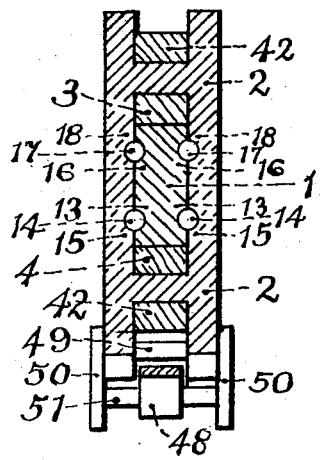
Fig. 8.
Inventor.
Aaron E. Bergey

UNITED STATES PATENT OFFICE.

AARON E. BERGEY, OF WARREN, OHIO.

MECHANISM FOR DRIVING TOOLS.

1,406,965.  Specification of Letters Patent.  Patented Feb. 21, 1922.

Application filed February 25, 1920. Serial No. 361,221.

*To all whom it may concern:*

Be it known that I, AARON E. BERGEY, a citizen of the United States, residing at No. 302 Parkman St., in the city of Warren, in the county of Trumbull and State of Ohio, have invented a new and useful Mechanism for Driving Tools, of which the following is a specification.

My invention relates to mechanisms for driving tools in which the tool is driven by means of a clutch whose action is determined by means of a control clutch. The object of my invention is to provide a mechanism that is efficient and economical, and that can be used for driving a great variety of tools.

I attain this object by mechanism illustrated in the accompanying drawings, in which—

Fig. 1 is a longitudinal section, Fig. 2 is a section on the line AA of Fig. 1, Fig. 3, Fig. 4, and Fig. 5, are diagrams showing different arrangements of driving belts, Fig. 6 is a side view of a special form of belt, Fig. 7 is a section on the line BB, and Fig. 8 is a section on the line CC.

Similar figures refer to similar parts throughout the several views.

1 is the drive block.

2 is the control block.

The blocks 1 and 2 are connected by gearing such that when the block 2 is moved in either direction, the block 1 is connected with a driving belt which forces it to move in a corresponding direction, and when the block 2 is held stationary, the block 1 is also held stationary.

3 and 4 are driving belts adapted to drive the block 1 forwardly and backwardly, respectively. They may be of any suitable type and material. If continuous, they are preferably made of a fibrous material; if linked, they are preferably made of metal.

They are adapted to be driven, through suitable gearing, by any suitable motive power, and are preferably mounted in one of the ways shown in Figs. 3, 4, and 5.

5, 6 is the main forwardly driving clutch.

7, 8 is the main backwardly driving clutch.

9, 10 is the forwardly driving control clutch.

11, 12 is the backwardly driving control clutch.

The clutch members 5 and 9 move with the member 3.

The clutch members 7 and 11 move with the member 4.

The clutch members 6 and 8 move with the block 1.

The clutch members 10 and 12 move with the block 2.

These four clutches may be of any suitable type, but balanced friction clutches, such as are shown in the drawings, are preferred. They are operated by moving the blocks 1 and 2 out of unison.

13, 14, 15 is a thrust mechanism connecting the blocks 1 and 2, and adapted to provide clutch thrust for operating the clutches 5, 6 and 9, 10.

16, 17, 18 is a thrust mechanism connecting the blocks 1 and 2, and adapted to provide clutch thrust for operating the clutches 7, 8 and 11, 12.

The cams 13 and 16 are attached to the block 1.

The cams 15 and 18 are attached to the block 2.

The thrust members 14 and 17 are made in roller form and are preferably spherical, as indicated in the drawings. They are placed between the cams to reduce friction. A roller bearing thrust mechanism works better than one without rollers.

The two thrust mechanisms are constructed so that when the blocks 1 and 2 are moved out of unison in one direction, they tend to grip one driving belt, and when they are moved out of unison in the other direction, they tend to grip the other driving belt. At one extreme end of travel, the clutches 7, 8 and 11, 12 are engaged to drive the block 1 backwardly; at the other extreme end of travel, the clutches 5, 6 and 9, 10 are engaged to drive the block 1 forwardly; and for intermediate positions of travel, the clutches 5, 6 and 7, 8 are disengaged, the block 1 remaining stationary, if the block 2 is held stationary, the clutches acting as holding brakes.

The cams 13, 15, 16, and 18 are preferably grooved and formed at an agle with the driving belts which is nearly equal to the angle of friction of the clutch surfaces, so that the clutches may be easy to engage or release.

The clutch thrust of the thrust mechanism exerts a force on the block 2 whose tendency is to disengage the clutches. The friction of the control clutch exerts a force on the block 2 whose tendency is to engage the clutches. The difference between these two forces is the operating force. It is the force that must be supplied to the block 2 to operate the clutches. For light work it is supplied directly by the muscle of the operator. For heavy work additional mechanism is provided, preferably as shown in the drawings.

19 is a control block. It is connected with the block 2 by the driving belts 3 and 4, the clutch 22, 23, the clutch 24, 25, the clutch 26, 27, the clutch 28, 29, and the thrust mechanisms 30, 31, 32 and 33, 34, 35. The action of these mechanisms is similar to that of the previously described corresponding driving belts 3 and 4, clutch 5, 6, clutch 7, 8, clutch 9, 10, clutch 11, 12, and thrust mechanisms 13, 14, 15 and 16, 17, 18, respectively.

The proportion of parts is made such that the operating force necessary to move the block 19 out of unison with the block 2 for the purpose of operating the clutches is much smaller than the force supplied by the driving belts to the block 2; and also that the operating force necessary to move the block 2 out of unison with the block 1 for the purpose of operating the clutches, is much smaller than the force supplied by the driving belts to the block 1.

Each of the three blocks 1, 2, and 19, controls the action of the one preceding. It is obvious that there may be arranged more than three blocks fulfilling this condition. As the number of such blocks is increased, the ratio of control force to driving force is decreased. Therefore, no matter how great the driving force may be, the control force can always be made small enough for the muscle of the operator.

The control force may be either positive or negative, that is, its direction may be the same as that of the driving force, or the opposite.

I provide a control force adjusting mechanism whereby the operating force can be made either positive or negative, great or small.

36 and 37 are friction drive members attached to the block 19 and adapted to be pressed against the belts 3 and 4.

38 and 39 are springs through which pressure is transmitted to the members 36 and 37, respectively.

40 and 41 are adjusting screws by means of which the pressure of the members 36 and 37 can be varied.

If the pressure on 37 is small and that on 36 is sufficiently great, the clutches 5, 6 and 9, 10 will become and remain engaged, unless prevented by the operator; and the block 1 is therefore driven forwardly, unless prevented by the operator. It will be seen that in this case the clutches may be operated by means of a single rope or chain attached to the block 19. For, by pulling the rope backwardly, the operator can cause the block 1 to be driven backwardly; by holding the rope stationary, he can cause the block 1 to remain stationary; and by allowing the rope to move forwardly, he can cause the block 1 to be driven forwardly. It will be seen that the block 1 can be driven at any speed not greater than that of the driving belts 3 and 4, being forced by the driving mechanisms to follow the motion of the control block and to remain stationary when the control block is held stationary. It will be seen that the clutches will slip, and supply force, as required.

42 are guides for the block 2. They form part of the frame on which the mechanism is mounted. They serve to prevent undue stresses in the driving belts from eccentric loading. The blocks 1 and 19 are guided in the block 2 by the thrust mechanisms previously described.

43 and 44 are stops or abutments which can be placed at different positions along one of the guides 42.

45 and 46 are dogs adapted to bump against the abutments 43 and 44, respectively, for the purpose of automatically operating the clutches.

47 is a member attached to the block 19 and having a limited motion thereon parallel to the guide 42. Its motion is limited in both directions by suitable abutments attached to the block 19.

48 is a spring in which energy can be stored by the driving mechanism, and from which energy can be released for the purpose of operating the clutches. Its ends are formed into the dogs 45 and 46.

49 is a shaft or pin in the block 2.

50 is a rocker link adapted to rock back and forth on the pin 49, so as to swing past a dead center.

51 is a pin in the link 50. The spring 48 is formed with a bearing for the pin 51.

52 is a rocker link pivoted on a center on the block 2.

53 is an adjusting screw turning in a nut in the link 52. It has a pivot bearing in the block 2. By means of it the tension of the spring 48 can be altered.

54 and 55 are pins in the members 47 and 52, respectively. Bearings are formed in the spring 48 for the pins 54 and 55.

The proportion of parts is made such that when the blocks move forwardly and the dog 46 strikes the abutment 44, the members 47, 48, 50, 51, 52, 54, and 55, are moved backwardly with reference to the blocks (being stopped by the abutment 44). During the first part of this relative backward motion, energy is stored in the spring 48. When the spring has passed the dead center, its energy is released as it moves backwardly away from the abutment 44. Thus it releases the forwardly driving clutches and engages the backwardly driving clutches, and the blocks are driven backwardly. At the other end of the travel of the blocks the operation is reversed. During the first part of the motion of the spring 48 (relatively to the block 2), and until after it has passed the dead center, the member 47 does not drive the control block 19; but during the latter part of its motion it moves the block 19 out of unison with the block 2, thus operating the clutches as previously explained.

The length of the forward and backward stroke can be varied by varying the position of the abutments 43 and 44.

In the special form of belt shown in Figs. 6 and 7, 56 are the driving links adapted to fit the driving sprocket wheel, 57 are the clutch links which are provided with braking surfaces adapted for friction clutches, and 58 are reinforcing links. The links 57 are made much thicker than the others, so that the other links will not be worn by the clutches until after the clutch links are considerably worn.

The tool to be driven may be attached directly to the block 1, or it may be connected with the block 1 by any suitable intermediate gearing.

The force for operating the clutches may be applied directly to the control block by the operator. It may also be supplied by any suitable motive power, controlled in any suitable manner.

The arrangement of driving belts shown in Fig. 3 is adapted for the case where the forward and backward speeds are the same.

The arrangement of driving belts shown in Fig. 4 is adapted for the case where the backward speed is to be different from the forward speed.

The arrangement of driving belts shown in Fig. 5 is convenient in case it is desired to drive several blocks in different directions.

I claim:

1. In a mechanism for driving tools, a driving belt, a driving block, a driving clutch by means of which the said driving belt is adapted to drive the said driving block, a control block, a control clutch adapted to control the action of the said driving clutch, and a roller bearing thrust mechanism connecting the said driving block and the said control block, the said thrust mechanism being constructed so that when the said control block is moved out of unison with the said driving block the said clutches are operated, substantially as described.

2. In a mechanism for driving tools, a driving belt, a driving block, a driving clutch by means of which the said driving belt is adapted to drive the said driving block, a main control block, a main control clutch adapted to control the action of the said driving clutch, a connecting mechanism connecting the said two blocks, said connecting mechanism being constructed so that when the said blocks are moved out of unison the said clutches are operated, a main control driving clutch by means of which the said driving belt is adapted to drive the said main control block, a second control block, a second control clutch adapted to control the action of the said main control driving clutch, and a control connecting mechanism, said control connecting mechanism being constructed so that when the said two control blocks are moved out of unison the said clutches are operated, substantially as described.

3. In a mechanism for driving tools, a driving belt, a driving block, a driving friction clutch by means of which the said driving belt is adapted to drive the said driving block, a main control block, a main control friction clutch, a main connecting mechanism constructed so that when the said blocks are moved out of unison the said clutches are operated, a main control driving friction clutch adapted to drive the said main control block and to be driven by the said driving belt, a second control block, a second control friction clutch, and a control connecting mechanism, said control connecting mechanism being constructed so that when the said two control blocks are moved out of unison the said clutches are operated, substantially as described.

4. In a mechanism for driving tools, a driving block, a forwardly driving clutch, a forwardly driving belt adapted to drive the said block forwardly by means of the said clutch, a backwardly driving clutch, a backwardly driving belt adapted to drive the said block backwardly by means of the said backwardly driving clutch, a forwardly acting control clutch adapted to control the action of the said forwardly driving clutch, a backwardly acting control clutch adapted to control the action of the said backwardly driving clutch, a control block, and a connecting mechanism, said connecting mechanism being constructed so that when the said two blocks are moved out of unison in one direction they are driven forwardly and when they are moved out of unison in the other direction they are driven backwardly, substantially as described.

5. In a mechanism for driving tools, a driving block, a control block, a forwardly driving belt, a backwardly driving belt, and a connecting mechanism, said connecting mechanism being constructed so that when the said control block is driven at any speed (not greater than that of the driving belts) in either direction the said driving block is forced by the said belts and the said connecting mechanism to move at the same speed in the same direction, substantially as described.

6. In a mechanism for driving tools, a driving block, a control block, a forwardly driving belt, a backwardly driving belt driven at a different speed from that of the forwardly driving belt, and a connecting mechanism, said connecting mechanism being constructed so that when the said control block is moved at any speed not greater than that of the driving belts in either direction the said driving block is forced by the said belts and the said connecting mechanism to move at the same speed in the same direction, substantially as described.

7. The combination claimed in claim 4, together with an automatic clutch operating mechanism adapted to cooperate with the said other mechanisms so as to give a reciprocating motion of predetermined length to the said blocks, substantially as described.

8. In a mechanism for driving tools, a driving block, a main control block, a second control block, a forwardly driving belt, a backwardly driving belt, a clutch mechanism, and a connecting mechanism, said connecting mechanism being constructed so that when the said second control block is moved out of unison with the said main control block in one direction the said main control block is moved out of unison with the said driving block thus causing the latter to be driven forwardly and when the said second control block is moved out of unison with the said main control block in the other direction the said main control block is moved out of unison with the said driving block in the other direction thus causing the said driving block to be driven backwardly, substantially as described.

9. In a mechanism for driving tools, a forwardly driving belt, a backwardly driving belt, a main control block through suitable openings in which the said belts can travel, a driving block placed within the said main control block and between the said belts, a second control block placed within the said main control block and between the said belts, and a connecting mechanism, said connecting mechanism being constructed so that when the said second control block is moved out of unison with the said main control block in one direction the said forwardly driving belt is gripped between the said control blocks thus forcing the said main control block out of unison with the said driving block and gripping the said forwardly driving belt between the said driving block and the said main control block, and when the said control blocks are moved out of unison in the opposite direction the said backwardly driving belt is gripped in a similar manner, the said forwardly driving belt being released, substantially as described.

10. In a mechanism for driving tools, a drive block, a forwardly driving belt, a number of control blocks arranged in succession, and a connecting mechanism, said connecting mechanism being constructed so that when any one of the said control blocks is moved forwardly the next preceding block will be driven forwardly by the said belt, substantially as described.

11. In a mechanism for driving tools, a drive block, a forwardly driving belt, a number of control blocks arranged in succession, and a connecting mechanism, said connecting mechanism being constructed so that when any one of the said control blocks is moved forwardly at a speed less than that of the said driving belt the next preceding block will be driven forwardly at the same speed by the said belt, substantially as described.

12. In a mechanism for driving tools, a drive block, a forwardly driving belt, a backwardly driving belt, a number of control blocks arranged in succession, and a connecting mechanism, said connecting mechanism being constructed so that when any one of the said control blocks is moved in either direction at a speed less than that of the said driving belts, the next preceding block will be driven in the same direction at the same speed by the said belts, substantially as described.

13. The combination claimed in claim 10, together with a speed limiting mechanism adapted to prevent the backward speed of the said blocks from exceeding a predetermined amount.

14. The combination claimed in claim 11, together with a speed limiting mechanism adapted to prevent the backward speed of the said blocks from exceeding a predetermined amount.

15. In a mechanism for driving tools, a driving belt, a driving block, a friction clutch for establishing and destroying driving relationship between said belt and said block, a control block normally moving in unison with said driving block, and a clutch operating mechanism, said clutch operating mechanism being constructed so that when said driving block and said control block are moved out of unison said clutch is operated, substantially as described.

16. In a mechanism for driving tools, a driving belt, a driving block, a main friction clutch for establishing and destroying driving relationship between said driving belt and said driving block, a control block normally moving in unison with said driving block, a control clutch for establishing and destroying driving relationship between said driving belt and said control block, and a clutch operating mechanism, said clutch operating mechanism being constructed so that when said control block and said driving block are moved out of unison said two clutches are operated, substantially as described.

AARON E. BERGEY.